(12) United States Patent
Grossmann

(10) Patent No.: US 9,010,110 B2
(45) Date of Patent: Apr. 21, 2015

(54) REGULATING FLAP ARRANGEMENT

(75) Inventor: Stefan Grossmann, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 86 days.

(21) Appl. No.: 13/979,384

(22) PCT Filed: Jan. 10, 2012

(86) PCT No.: PCT/US2012/020721
§ 371 (c)(1),
(2), (4) Date: Jul. 12, 2013

(87) PCT Pub. No.: WO2012/102854
PCT Pub. Date: Aug. 2, 2012

(65) Prior Publication Data
US 2013/0291538 A1    Nov. 7, 2013

(30) Foreign Application Priority Data

Jan. 27, 2011 (DE) .......................... 10 2011 009 610

(51) Int. Cl.
| F02B 37/18 | (2006.01) |
|---|---|
| F02B 37/12 | (2006.01) |
| F16K 1/20 | (2006.01) |
| F01N 13/18 | (2010.01) |
| F16K 1/22 | (2006.01) |
| F02B 37/00 | (2006.01) |

(52) U.S. Cl.
CPC ............. *F02B 37/127* (2013.01); *F16K 1/2064* (2013.01); *F01N 13/1827* (2013.01); *F02B 37/004* (2013.01); *F02B 37/183* (2013.01); *Y02T 10/144* (2013.01); *F16K 1/221* (2013.01)

(58) Field of Classification Search
CPC .. F01N 13/1827; F02B 37/004; F02B 37/127; F02B 37/183; F16K 1/2064; F16K 1/221; Y02T 10/144
See application file for complete search history.

(56) References Cited

U.S. PATENT DOCUMENTS

| 4,850,521 A * | 7/1989 | Servant .......................... 277/614 |
| 8,104,273 B2 * | 1/2012 | Barrieu et al. .................. 60/323 |
| 8,474,251 B2 * | 7/2013 | Beyer et al. ..................... 60/321 |
| 2009/0322039 A1 * | 12/2009 | Kullen et al. ................. 277/608 |

* cited by examiner

*Primary Examiner* — Jesse Bogue
(74) *Attorney, Agent, or Firm* — A. Michael Tucker; Stephan A. Pendorf; Patent Central LLC

(57) ABSTRACT

A regulating flap arrangement (1) in a flange connection (2) between a turbine housing of a two-stage exhaust-gas turbocharger and an exhaust manifold of an engine, having a regulating flap plate (5) which is pivotable between an open position and a closed position for opening and closing a connecting opening (6) arranged in the flange connection (2); having an insert ring (7) which is arranged in the connecting opening (6); and having a sealing arrangement (8), wherein the sealing arrangement (8) has two V-rings (8A, 8B), of which a first V-ring (8A) is arranged in a first groove (9) provided adjacent to the connecting opening (6), and the second V-ring (8B) is arranged in a second groove (10) which is arranged, spaced apart radially outward from the first groove (9), in the flange connection (2).

14 Claims, 4 Drawing Sheets

REGULATING FLAP ARRANGEMENT

Figure 1:
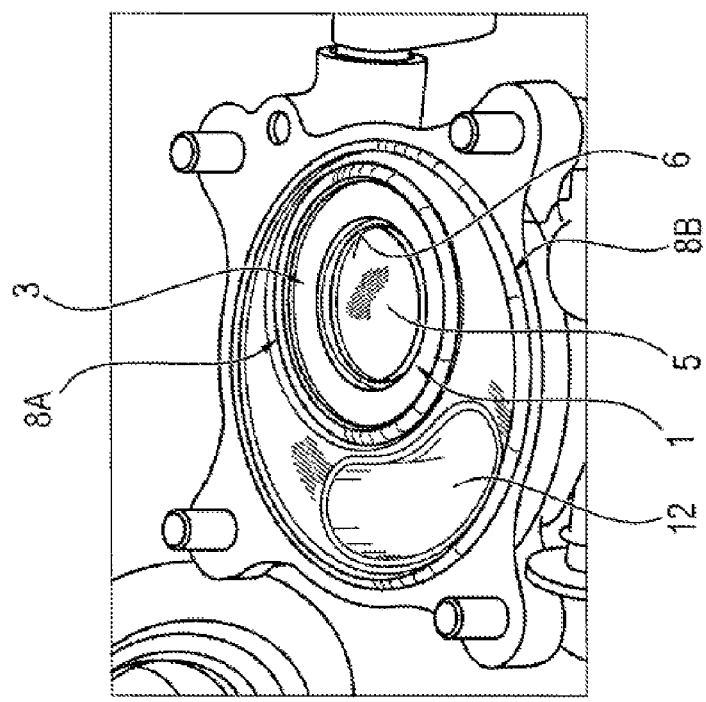

The invention relates to a regulating flap arrangement as per the preamble of claim 1.

A regulating flap arrangement of said type may be provided in a flange connection between a turbine housing of an exhaust-gas turbocharger and an exhaust manifold of an engine. In particular, such a regulating flap arrangement may be provided between the turbine housing of a low-pressure turbine of a two-stage turbocharger arrangement and the exhaust manifold of an engine. Said exhaust manifold may be an exhaust manifold module with a high-pressure turbine housing integrated therein or attached thereto by screw connection. In the case of a known regulating flap arrangement, the sealing in the region of the flange connections is realized by means of a crimp seal, which is however of very cumbersome design because a large number of screws are required. Furthermore, said crimp seal causes problems from a space aspect in the packaging of the overall arrangement.

It is therefore an object of the present invention to provide a regulating flap arrangement of the type specified in the preamble of claim 1, which makes it possible to dispense with a cumbersome crimp seal.

Said object is achieved by means of the features of claim 1.

According to said solution, a sealing arrangement is provided which has two V-rings arranged radially spaced apart from one another in the flange connection. For this purpose, the first V-ring is arranged in a groove provided adjacent to the connecting opening between the turbine housing of a low-pressure turbine and the exhaust manifold. The second V-ring is arranged in a second groove which, as viewed from the central point of the connecting opening, is arranged, spaced apart radially outward from the first groove, in the flange connection.

The subclaims relate to advantageous refinements of the invention.

The first groove of the seal arrangement may be arranged either in the flange connection or in an insert ring which is arranged in the connecting opening and which forms, and seals off at both sides, the seat of the regulating flap plate of the regulating flap arrangement.

If the first groove is provided in the flange connection, said groove may, depending on what type of flange connection is involved, be arranged in a flange of the turbine housing or in a flange of the exhaust manifold which is connected to the turbine housing.

If the regulating flap arrangement according to the invention is used in a two-stage turbocharger arrangement, the groove may be arranged either in a flange of the housing of the low-pressure turbine or in a flange of the exhaust manifold of the engine.

Said second groove of the regulating flap arrangement according to the invention is arranged, in the same way as the first groove, in the flange.

In all alternative possible arrangements, the provision of the V-rings in grooves yields the advantage in each case that the V-rings are protected against an excessive introduction of heat by the ridge of the groove situated adjacent to the connecting opening in each case.

It is also possible for the one or more V-rings to each be under preload.

The regulating flap plate is preferably of circular design.

Figure 2:
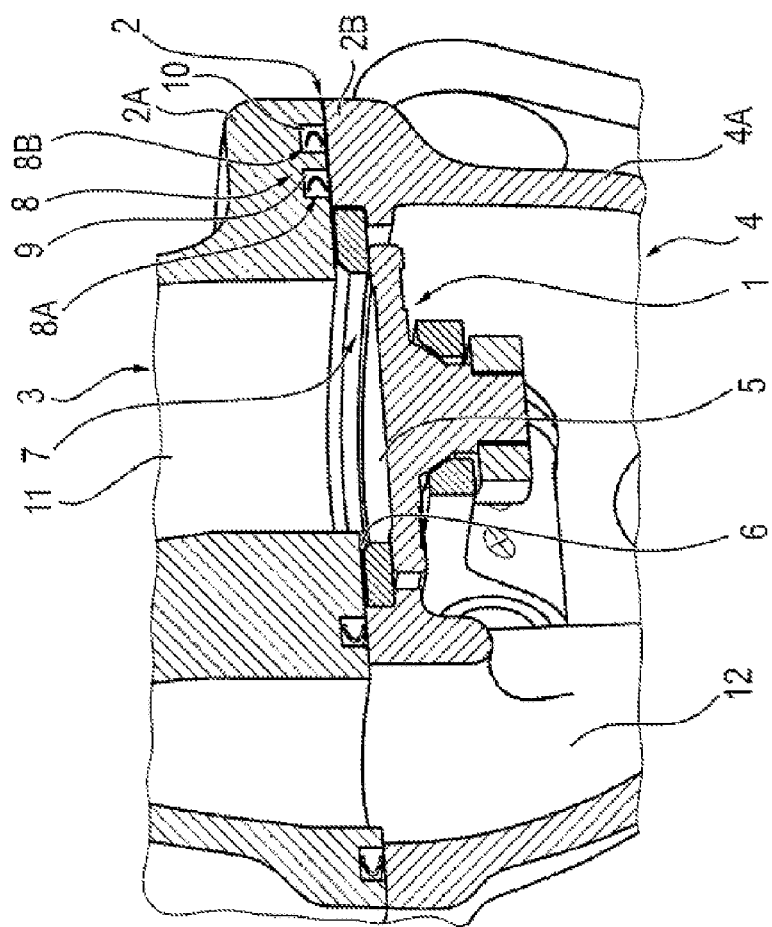
Figure 4:
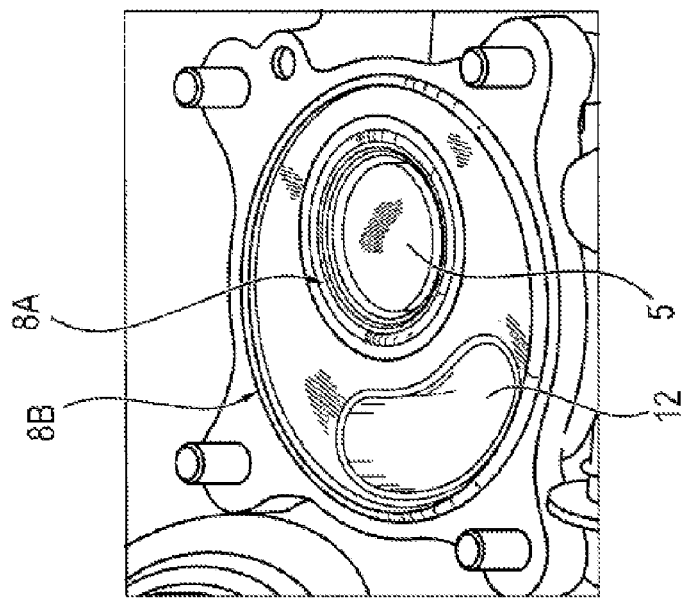
Figure 3:
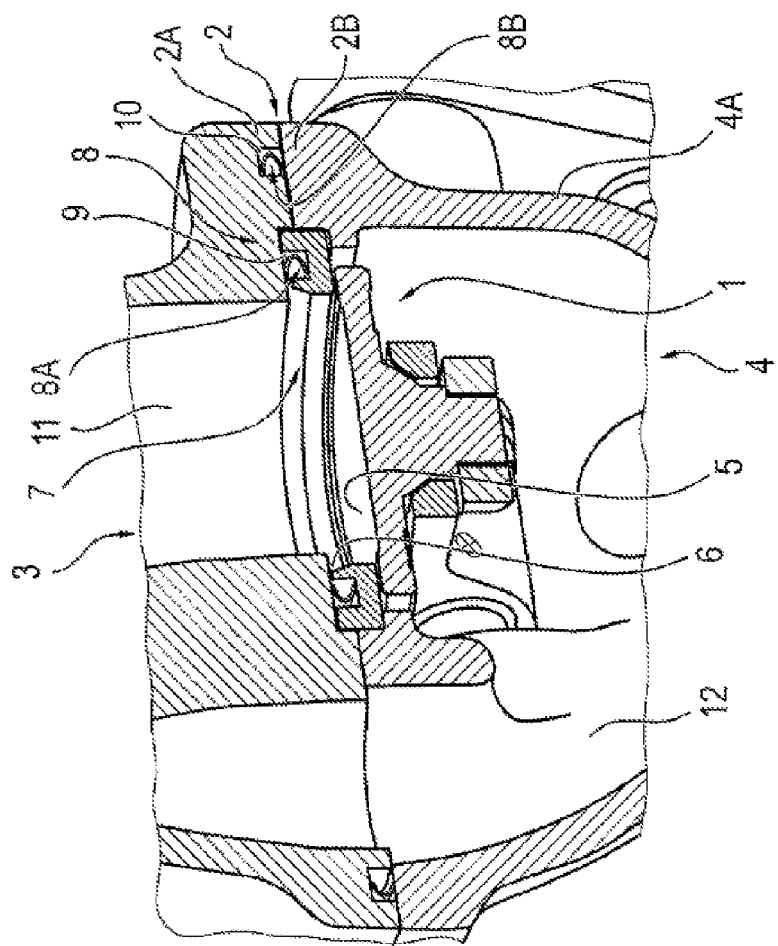
Figure 5:
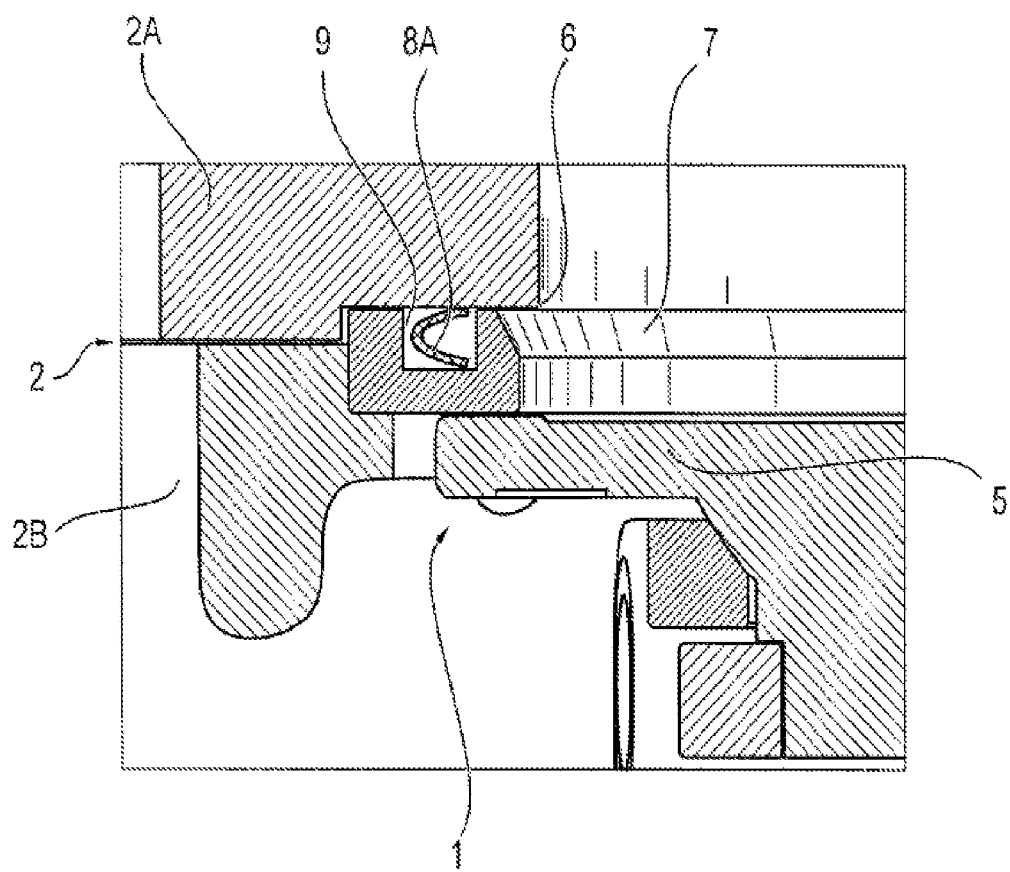
Figure 6:
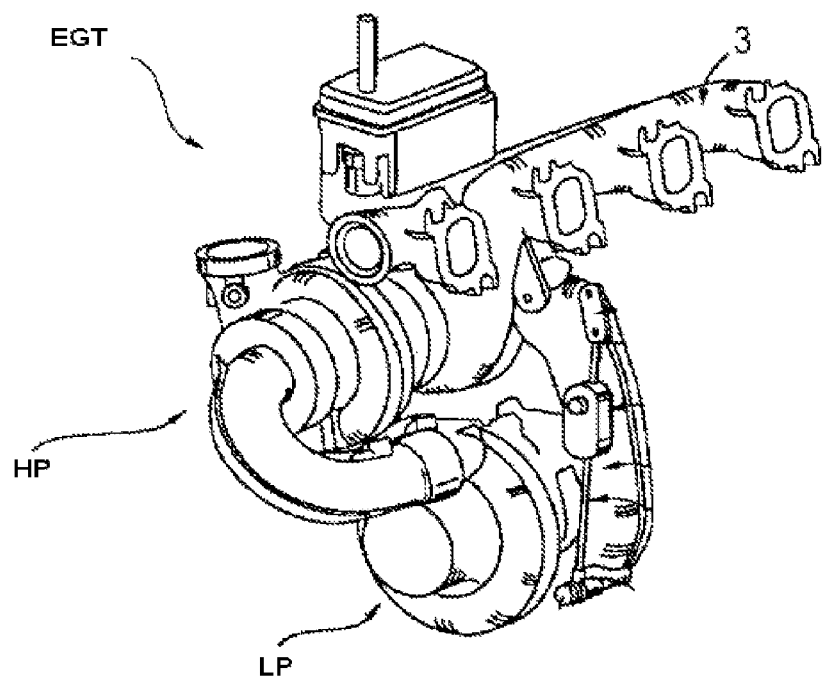

Further details, features and advantages of the invention will emerge from the following description of exemplary embodiments on the basis of the drawing, in which:

FIGS. 1 and 2 show a first embodiment of the regulating flap arrangement according to the invention, FIGS. 3 to 5 show a second embodiment of the regulating flap arrangement according to the invention, and FIG. 6 shows a perspective illustration of a two-stage turbocharger arrangement.

FIGS. 1 and 2 illustrate a regulating flap arrangement 1 in a flange connection 2, which regulating flap arrangement is used, in the example, in a two-stage turbocharger arrangement. Of said two-stage turbocharger arrangement, FIGS. 1 and 2 show an exhaust manifold 3 with an outlet duct and a low-pressure turbine 4 with a turbine housing 4A.

The exhaust manifold 3 has a flange 2A and the turbine housing 4A has a flange 2B, which flanges form the flange connection 2.

The regulating flap arrangement 1 according to FIGS. 1 and 2 also has a regulating flap plate 5 which is pivotable between an open position and a closed position, wherein FIGS. 1 and 2 each show the closed position. The regulating flap plate 5 opens and closes a connecting opening 6 which creates a flow connection between the exhaust manifold 3 and the turbine housing 4A. Here, the connecting opening 6 is arranged in the outlet duct 11, wherein FIGS. 1 and 2 also show a connecting duct 12 which is a constituent part of the exhaust manifold and which connects the turbine housing of the high-pressure turbine (not illustrated) to the turbine housing 4A of the low-pressure turbine 4, as can be seen in detail from the diagrammatic illustration of FIGS. 1 and 2.

FIGS. 1 and 2 also show that the regulating flap plate 5 is arranged in the outlet duct 11 on the side of the low-pressure turbine housing 4A.

Arranged in the connecting opening 6 is an insert ring 7 which, in the closed position shown in FIGS. 1 and 2, interacts with the regulating flap plate 5 in order to seal off the outlet duct 11, as can be seen in particular from the sectional illustration of FIG. 1.

Furthermore, the regulating flap 1 according to the invention has a sealing arrangement 8, which according to the invention comprises two V-rings 8A and 8B.

The V-ring 8A is arranged in a groove 9 which, in the example, is arranged in the flange 2A and is provided adjacent to the connecting opening 6.

A second groove 10 is formed in the flange 2A radially to the outside of said first groove 9, in which second groove is arranged the second V-ring 8B of the sealing arrangement 8. As a result of this arrangement, it is achieved that the inner V-ring 8A or the inner V-ring seal separates the outlet duct 11 and the connecting duct 12 from one another, while the outer V-ring 8B or the outer V-ring seal serves to seal off the entire flange connection 2 to the outside.

As explained in the introduction, the grooves arranged in the flange 2A in the example could however also in principle be arranged in the flange 2B.

The second embodiment of the regulating flap arrangement 1 can be seen from a juxtaposition of FIGS. 3 to 5. All parts corresponding to the embodiment of FIGS. 1 and 2 are provided with the same reference numerals, such that in this regard, reference can be made to the above explanation of FIGS. 1 and 2.

The difference between the two embodiments is that the inner V-ring seal or the V-ring 8A is provided in the insert ring 7, such that the first groove 9 is accordingly arranged in said insert ring 7. This can be clearly seen in particular from the enlarged detail view of FIG. 5. In addition to the advantage that it is possible to obtain a sealing action to the outside which is improved in relation to the prior art, which advantage is also inherent in the embodiment according to FIGS. 1 and 2, the embodiment according to FIGS. 3 to 5 yields the further advantage of a radial space saving as a result of the arrangement of the V-ring 8A in the insert ring 7.

Both embodiments yield a simplification of the design as a result of the possibility of eliminating a complicated crimp seal such as is provided in the prior art.

In the second embodiment, aside from an unchanged outer diameter and the advantage of the said space saving, it is made possible to perform monitored pre-assembly of the V-ring 8A and of the insert ring 7, as a result of which less expenditure is involved in the assembly of the exhaust manifold 3 and of the turbine housing 4A.

In both embodiments, the insert ring 7 may be under preload, which yields an improved sealing action in relation to a known crimp seal.

The resulting reduced leakage in turn advantageously yields an improved response behavior of the high-pressure stage of a two-stage turbocharger arrangement, because as a result of the improved sealing, when the regulating flap 5 is closed, there is less exhaust-gas leakage from the outlet duct 11 to the connecting duct 12, and therefore all of the exhaust gas is supplied only to the high-pressure turbine.

To supplement the disclosure, reference is made to FIG. 6, which shows a two-stage turbocharger arrangement EGT which is connected to the exhaust manifold 3. As is conventional, the two-stage turbocharger arrangement EGT has a high-pressure stage HP (high-pressure turbocharger) and a low-pressure stage LP (low-pressure turbocharger). A two-stage turbocharger arrangement EGT of said type self-evidently also has all the other elements of such arrangements, which however need not be described for the purposes of explaining the present invention.

In addition to the written disclosure above, reference is hereby explicitly made to the diagrammatic illustration thereof in FIGS. 1 to 5.

LIST OF REFERENCE SYMBOLS

1 Regulating flap arrangement
2 Flange connection
2A, 2B Flanges of the flange connection 2
3 Exhaust manifold
4 Low-pressure turbine
4A Turbine housing
5 Regulating flap plate
6 Connecting opening
7 Insert ring
8 Sealing arrangement
8A, 8B V-rings/V-ring seals
9, 10 Grooves
11 Outlet duct
12 Connecting duct
13 High-pressure turbine
EGT Two-stage exhaust-gas turbocharger arrangement
HP High-pressure stage
LP Low-pressure stage

The invention claimed is:

1. A regulating flap arrangement (1) in a flange connection (2) between a turbine housing of a two-stage exhaust-gas turbocharger and an exhaust manifold of an engine, comprising:
   a regulating flap plate (5) which is pivotable between an open position and a closed position for opening and closing a connecting opening (6) arranged in the flange connection (2);
   an insert ring (7) which is arranged in the connecting opening (6); and
   having a sealing arrangement (8),
   wherein the sealing arrangement (8) has two V-rings (8A, 8B), of which a first V-ring (8A) is arranged in a first groove (9) provided adjacent to the connecting opening (6), and the second V-ring (8B) is arranged in a second groove (10) which is arranged, spaced apart radially outward from the first groove (9), in the flange connection (2).

2. The regulating flap arrangement as claimed in claim 1, wherein the first groove (9) is arranged in the flange connection (2).

3. The regulating flap arrangement as claimed in claim 1, wherein the first groove (9) is arranged in a flange of the turbine housing.

4. The regulating flap arrangement as claimed in claim 3, wherein the flange is a flange (2B) of the low-pressure turbine (4).

5. The regulating flap arrangement as claimed in claim 3, wherein the flange is a flange (2A) of the high-pressure turbine (13).

6. The regulating flap arrangement as claimed in claim 1, wherein the first groove (9) is arranged in a flange of the exhaust manifold (3).

7. The regulating flap arrangement as claimed in claim 1, wherein the first groove (9) is arranged in the insert ring (7).

8. The regulating flap arrangement as claimed in claim 1, wherein the second groove (10) is arranged in a flange of the turbine housing.

9. The regulating flap arrangement as claimed in claim 8, wherein the flange of the second groove (10) is a flange (2B) of the low-pressure turbine (4).

10. The regulating flap arrangement as claimed in claim 8, wherein the flange of the second groove (10) is a flange (2A) of the high-pressure turbine (13).

11. The regulating flap arrangement as claimed in claim 8, wherein the second groove (10) is arranged in a flange (2A) of the exhaust manifold (3).

12. The regulating flap arrangement as claimed in claim 1, wherein the regulating flap plate (5) is circular.

13. The regulating flap arrangement as claimed in claim 1, wherein the insert ring (7) is under preload.

14. The regulating flap arrangement as claimed in claim 1, wherein the first V-ring (8A) and/or the second V-ring (8B) are/is under preload.

* * * * *